United States Patent [19]

Giannitrapani

[11] Patent Number: 4,656,740

[45] Date of Patent: Apr. 14, 1987

[54] FOUR PRONGED CARVING-FORK HAVING TWO PAIRS OF SPACED PARALLEL PRONGS

[76] Inventor: Francesco P. Giannitrapani, Via Castiglione d'Orcia, 24-Roma, Italy

[21] Appl. No.: 756,266

[22] Filed: Jul. 18, 1985

[30] Foreign Application Priority Data

Feb. 3, 1984 [IT] Italy ............................. 35560/84[U]

[51] Int. Cl.⁴ ............................................. A47J 43/28
[52] U.S. Cl. ........................................ 30/322; D7/137
[58] Field of Search .................... 30/322, 323; D7/137

[56] References Cited

U.S. PATENT DOCUMENTS 2,835,971  5/1958  Neuman .................................. 30/322

FOREIGN PATENT DOCUMENTS 459558  5/1928  Fed. Rep. of Germany ........ 30/322
955031  1/1950  France ................................... 30/322

Primary Examiner—Douglas D. Watts
Attorney, Agent, or Firm—Wigman & Cohen

[57] ABSTRACT

A carving-fork with four prongs which are parallel to one another to take food from a dish, in particular in a self-service, wherein the carving-fork comprises a handle supporting through a shank two pairs of pointed prongs, the forward pair of which is spaced from the back one. The prongs of each pairs are connected to each other by junction portion which are connected at an angle to the handle.

6 Claims, 3 Drawing Figures

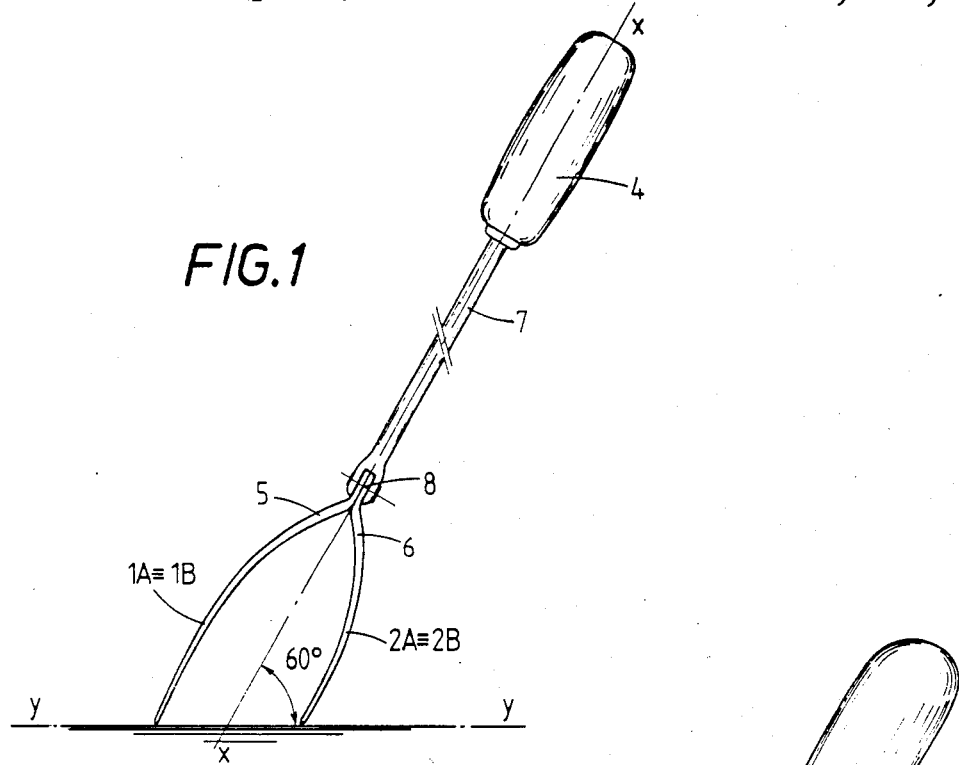
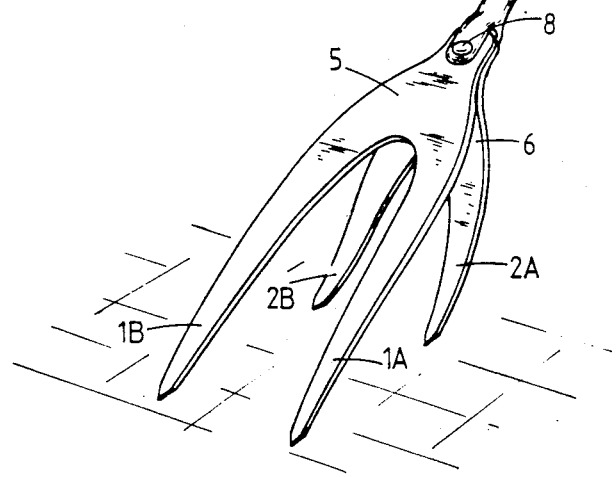

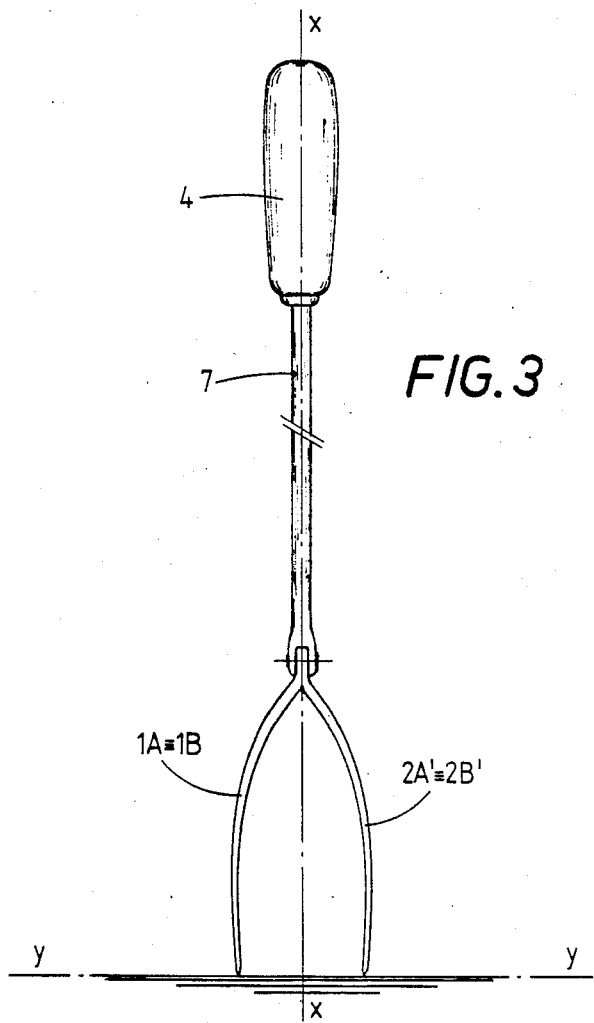

FOUR PRONGED CARVING-FORK HAVING TWO PAIRS OF SPACED PARALLEL PRONGS

FIELD OF THE INVENTION

The present invention relates to a carving-fork with four pointed, parallel prongs, which are connected in pairs facing to and spaced from one another, said carving-fork being designed to allow food to be taken from a container or a course dish by a chef and in case of a self-service to take food to be eaten or to be divided in slices, pieces, helpings or the like without any danger that the portion of the selected food can slip and fall down during the transfer from the course dish to the plate of the consumer. If the carving-fork is used by the chef, said chef can drive it into the body of a bird, a whole roast, a stuffed trotter or the like in order to divide them in portions. Said carving-fork is particularly useful when helpings of poultry or game, sausages or the like are offered to the consumer in a self-service or when beefsteak or sirloins or generally food have to be taken, that owing to their form or dimension and/or their particular shape could more easily slip out of a traditional fork, the prongs of which are very near and aligned with one another.

SUMMARY OF THE INVENTION

In the carving-fork in question the four prongs are arranged parallel to one another at the four corners of a parallelepiped having a rectangular cross-section and then they run into the food in four points placed at the corners of a rectangle or square.

The length of the forward prongs is greater than or equal to that of the back prongs. In the preferred embodiment the length of the prongs of the forward pair is greater than that of the prongs of the back pair by an amount such as to cause an angle of about 60° to be formed between the axis X—X of the carving-fork shank and of the handle thereof and the plane Y—Y passing by the points of the carving-fork.

BRIEF DESCRIPTION OF THE DRAWINGS

The accompanying drawings show two embodiments of the carving-fork according to the present invention, wherein:

FIG. 1 is a side view of the carving-fork according to the preferred embodiment;

FIG. 2 is a perspective view of said carving-fork of FIG. 1; and

FIG. 3 is a side view of a variant.

DETAILED DESCRIPTION OF THE INVENTION

The so-called carving-fork is made of metallic material and the handle 4 thereof can be made of any suitable material, for example, a thermoinsulating material.

A metallic shank is designated by the numeral 7 and is partially inserted at one end in the handle 4 and it is fastened at the second end 8 to two pairs of prongs 1A, 1B and 2A, 2B, said prongs being parallel to one another. The prongs of each pair 1A, 1B and 2A, 2B are connected to each other by means of a junction portion 5 and 6 respectively, which are bent to each other and are connected to an end of the shank 7. The prongs 1A, 1B and 2A, 2B project from the junction portions 5, 6 in a direction generally parallel to the shank 7 so that the points of the prongs 1A, 1B, 2A, 2B can run easily into the food helping to be taken from the course dish at four points corresponding to the corners of a rectangle or a square so as to have a good hold particularly of the food helpings having curved surfaces like for example a leg of chicken, a sausage or the like or also of the whole body of a bird, a stuffed trotter or the like to be divided into portions.

In the preferred embodiment of FIGS. 1 and 2, the pair of forward prongs (1A, 1B) have a length greater than that of the back prongs (2A, 2B) so that the plane Y—Y of the prongs' points forms an angle of about 60° with the axis (X—X) of the shank 7 and of the handle 4, the carving-fork can be of use to a waiter to serve spaghetti or the like which are wound round the ends of the forward prongs 1A, 1B projecting with respect to the prongs 2A, 2B. In the alternative embodiment of FIG. 3 the four prongs 1A, 1B and 2A', 2B' have the same length.

What is claimed is:

1. A carving-fork, comprising two curved metal bodies, each comprising a pair of substantially parallel prongs provided with sharped edges and tips, said prongs defining a front pair of prongs and a back pair of prongs;

an upper junction for connecting the two pairs of prongs to one another;

a single shank, the free end of which is connected to the upper junction so as to form an acute angle therebetween thereby interconnecting the two pairs of prongs with said single shank, and the other end of the shank of the carving-fork being connected to a handle;

said shank and handle defining a longitudinal axis;

wherein the two pairs of prongs face one another and are spaced apart from one another while the facing surfaces of the prongs are concave with respect to one another, with the upper junctions thereof converging to support said prongs, so that the tips of the prongs are substantially parallel to one another and are placed at the corners of a parallelepiped having a roughly rectangular cross-section, while the tips of said prongs lie in a transverse plane forming an angle of less than 90° with respect to the axis of the shank and handle and wherein the tips of the front prongs lie in a first longitudinal plane which is parallel with and spaced at a distance from the longitudinal axis of the shank and handle and the tips of the back prongs lie in a second longitudinal plane which is parallel with and spaced at a distance from the longitudinal axis in a direction which is opposite to the direction in which said first plane is spaced from said longitudinal axis.

2. The carving fork according to claim 1, wherein the length of the prongs of the front pair is greater than or equal to that of the prongs of the back pair.

3. The carving fork acording to claim 1, wherein the length of the pair of front prongs is greater than that of the prongs of the back pair by such an amount as to cause an angle of about 60° to be formed between the axis of the shank and of the handle thereof and the plane passing by all the points of the prongs.

4. The carving fork according to claim 3, wherein a first two of the prongs are integrally formed with a first upper junction and a second two of the prongs are integrally formed with a second upper junction, the first and second upper junctions being connected to the shank.

5. The carving fork according to claim 4, wherein the first two prongs are longer than the second two prongs.

6. The carving fork according to claim 5, wherein the axis of the shank intersects a plane extending through the tips of all four prongs with a 60° angle.

* * * * *